United States Patent [19]
Asanuma et al.

[11] Patent Number: 5,869,753
[45] Date of Patent: Feb. 9, 1999

[54] SYSTEM FOR ESTIMATING THE ROAD SURFACE FRICTION

[75] Inventors: Nobuyoshi Asanuma; Kiyoshi Wakamatsu; Yoshimitsu Akuta; Manabu Ikegaya; Nobuo Sugitani; Yukihiro Fujiwara, all of Saitama-ken, Japan

[73] Assignee: Honda Giken Kogyo Kabushiki Kaisha, Tokyo, Japan

[21] Appl. No.: 697,233

[22] Filed: Aug. 21, 1996

[30] Foreign Application Priority Data

Aug. 25, 1995 [JP] Japan .................................. 7-240810
Apr. 17, 1996 [JP] Japan .................................. 8-120968

[51] Int. Cl.$^6$ .................................................. G01M 15/00
[52] U.S. Cl. ..................... 73/117.3; 73/116; 364/426.018; 364/426.025; 364/426.016
[58] Field of Search ..................... 364/426.015, 426.016, 364/426.017, 426.018, 426.019, 426.025, 426.036; 73/116, 117.2, 117.3, 118.1

[56] References Cited

U.S. PATENT DOCUMENTS

| | | | |
|---|---|---|---|
| 4,882,693 | 11/1989 | Yopp | 364/426.015 |
| 4,984,165 | 1/1991 | Müller et al. | 364/426.019 |
| 5,275,475 | 1/1994 | Hartmann et al. | 364/426.016 |
| 5,311,431 | 5/1994 | Cao et al. | 364/426.016 |
| 5,332,300 | 7/1994 | Hartmann et al. | 364/426.025 |
| 5,357,434 | 10/1994 | Zimmer et al. | 364/426.019 |

*Primary Examiner*—George M. Dombroske
*Attorney, Agent, or Firm*—Weiner, Carrier, Burt & Esser, P.C.; Joseph P. Carrier; Irving M. Weiner

[57] ABSTRACT

The road friction is determined from the deviation of the estimated yaw rate under a standard condition from the actually measured yaw rate. The system for determining the road friction includes a parameter identification unit which determines a parameter of a variation term defined in the transfer function of the model for the vehicle response. The variation term may consist of a zero-th order or a first-order transfer function which would not cause any large computation load, and may not depend on the vehicle speed. The determined road friction may be used for controlling the rear wheel steering angle of a four wheel steering vehicle.

9 Claims, 10 Drawing Sheets

SYSTEM FOR ESTIMATING THE ROAD SURFACE FRICTION

TECHNICAL FIELD

The present invention relates to a system for estimating the road surface friction according to the turning behavior of the vehicle, and in particular to such a system which is suitable for controlling the turning behavior of a four-wheel steering vehicle.

BACKGROUND OF THE INVENTION

Four-wheel steering vehicles are provided with steerable rear wheels, and the rear wheels are normally steered so as to provided an optimum lateral response of the vehicle according to the traveling speed of the vehicle, and the steering angle of the front wheels. For instance, a target yaw rate is defined according to the operating condition of the vehicle, and the rear wheels are steered so as to achieve the target yaw rate. However, this target yaw rate is defined for a normal tire and for a fixed predetermined road condition, and may not necessarily give rise to an optimum lateral response of the vehicle depending on the conditions of the tires and the road surface. In particular, it is desirable to know the road friction or the friction between the tires and the road surface because the optimum lateral response of the vehicle depends much on the road friction. For instance, the properties of the tires (snow tires and high performance tires as opposed to normal tires), the weather conditions (snow accumulation, moisture on the road surface) and other conditions of the road surface can significantly change the road friction.

It is possible to estimate the road friction according to the internal pressure of the hydraulic cylinder of the power steering system. A number of sophisticated methods have been proposed in the past, but they are either too expensive or too unreliable to implement.

It is conceivable to indirectly estimate the road friction from the operating conditions of the vehicle, the lateral response of the vehicle, and an output from a yaw rate sensor. However, the lateral response of the vehicle can be accurately expressed only by a transfer function of at least second order if it can be expressed with a linear function with a sufficient accuracy at all. It is known that the lateral response depends significantly on the vehicle speed. Thus, the algorithm for identifying the transfer function for the lateral response tends to be highly complex so that the capacity of the ECU (electronic control unit) for the four-wheel steering control needs to be unduly great. Thus, according to this approach, a high cost is required, and, yet, it is doubtful if a desired accuracy can be attained.

BRIEF SUMMARY OF THE INVENTION

In view of such problems of the prior art, a primary object of the present invention is to provide a system for estimating the road friction at a high precision without requiring any expensive sensors.

A second object of the present invention is to provide a system for estimating the road friction at a high precision without unduly increasing the computing capability of the control unit.

A third object of the present invention is to provide a system for estimating the road friction with a minimum time delay.

A fourth object of the present invention is to provide a system for estimating the road friction which is reliable when used for controlling the lateral response of the vehicle.

According to the present invention, these and other objects can be accomplished by providing a road friction estimating system, comprising a yaw rate sensor for detecting an actual yaw rate of a vehicle; standard yaw rate computing means for computing a standard yaw rate according to a yaw rate response model of said vehicle and vehicle operating data including a steering wheel steering angle and a vehicle speed assuming that said vehicle is equipped with standard tires and traveling over a standard road surface, said yaw rate model being expressed by a transfer function including a variation term; identification means which determines a parameter of said variation term of said transfer function according to a deviation of said actual yaw rate detected by said yaw rate sensor from said standard yaw rate computed by said standard yaw rate; and converting means for converting said parameter determined by said identification means into a value representing a frictional property between a road surface and said tires.

Thus, the road friction can be accurately estimated without requiring any special sensor or a complex computation process. In particular, because only the variation term of the transfer function of the vehicle response is required to be identified, the computational load is minimized. Typically, said parameter of said variation term is identified as a parameter which minimizes said deviation of said actual yaw rate detected by said yaw rate sensor from said standard yaw rate computed by said standard yaw rate computing means, and said identification means carries out a recursive process involving a plurality of steps of substituting of a parameter identified in a current step into said transfer function for a subsequent step. The variation term may even consist of a zero-th order transfer function, or a first-order transfer function. In the former case, because the transfer function does not depend on the vehicle speed, the necessary computation can be particularly simplified.

In order to stabilize the system against any spurious noises included in the sensor signals, it is preferable to include a low pass filter placed between said yaw rate sensor and said identification means, and/or a low pass filter placed between said standard yaw rate computing means and said identification means.

Also, it is essential for the system not to overestimate the road friction. In particular, when the steering wheel is being turned back toward the neutral position, due to the phase delay in the actual yaw rate, the road friction tends to be overestimated. Therefore, it is preferable to store the road friction obtained in a preceding control cycle, and use this value for the current control cycle if the steering wheel is being turned back toward the neutral position.

The road friction is an important parameter which has a significant influence over the yaw response or the lateral acceleration of the vehicle, and the thus obtained road friction can be used for various control and warning purposes. In particular, the road friction can be used for determining a standard yaw response of the vehicle when controlling the rear wheel steering angle of a fourwheel steering vehicle so that the handling of the vehicle may stay constant and stable without regard to the changes in the operation conditions and external disturbances. The estimated road friction can be used also for controlling ABS (anti-lock brake systems), TCS (traction control systems) and four-wheel drive systems.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
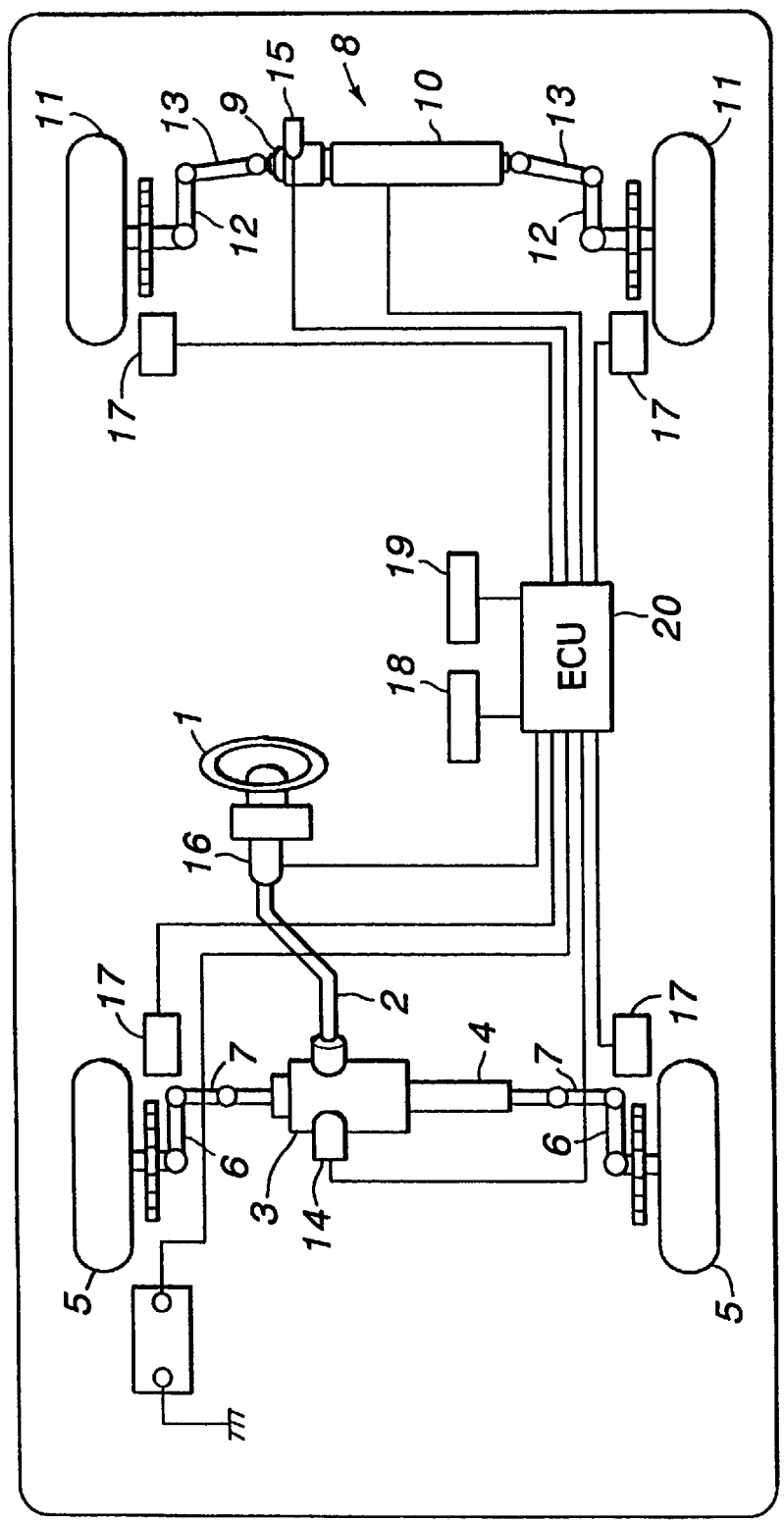
FIG. 1 is a diagram of a four wheel steering vehicle to which the present invention is applied.

FIG. 1 shows the overall structure of a front and rear wheel steering device to which the present invention is applied. A steering wheel 1 is fixedly attached to the upper end of a steering shaft 2 which is in turn mechanically coupled to a steering rod 4 of a front wheel steering device 3 at its lower end. The two ends of the steering rod 4 are coupled to knuckle arms 6 of right and left front wheels 5 via tie rods 7, respectively.

A rear wheel steering device 8 is disposed in a rear part of the vehicle, and comprises an electric motor 10 for actuating a steering rod 9 extending laterally of the vehicle body. The two ends of the steering rod 9 are coupled to knuckle arms 12 of right and left rear wheels 11 via tie rods 13, respectively.

The front and rear wheel steering devices 3 and 8 are provided with steering angle sensors 14 and 15 for detecting the steering angles of the front and rear wheels 5 and 11 from the displacements of the steering rods 4 and 9, respectively.

A steering angle sensor 16 is provided on the steering shaft 2 to detect the angle of the steering wheel 1. The wheels 5 and 11 are each provided with a vehicle speed sensor 17, and a lateral acceleration sensor 18 and a yaw rate sensor 19 are provided in suitable locations of the vehicle body. These sensors 14 to 19 are electrically connected to a computer unit 20 for controlling the operation of the electric motor 10.

According to this steering system, as the vehicle operator turns the steering wheel 1, the steering rod 4 of the front wheel steering device 3 is mechanically actuated, optionally, assisted by a power steering system, and the front wheels 5 are steered accordingly. At the same time, the steering angle of the steering wheel 1 and the displacement of the steering rod 4 are supplied to the computer unit 20 via the steering angle sensors 14 and 16. Thus, according to the input values of the front wheel steering angle, the vehicle speed, the lateral acceleration, and the yaw rate, the computer unit 20 determines the optimum steering angle of the rear wheels 11, and drives the electric motor 10 until the rear wheels 11 are steered to this optimum steering angle.

Now the control process carried out in the computer unit 20 is described in the following with reference to FIGS. 2 and 3.

Figure 2:
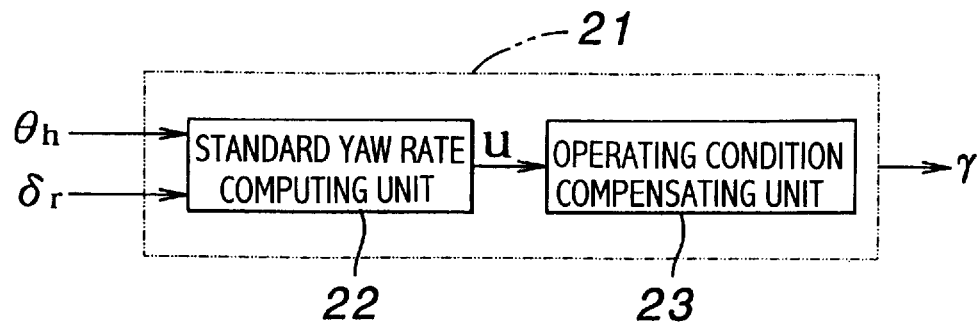
FIG. 2 is a block diagrams for describing the basic principle of the present invention.

FIG. 2 is a block diagram of a mathematical model of the yaw rate response of a vehicle, and may consist of an actual yaw rate computing unit 21 for computing the actual yaw rate of a vehicle. This mathematical model allows the actual yaw rate $\gamma$ to be computed from the vehicle speed V, the steering wheel steering angle $\Lambda_h$ and the rear wheel steering angle $\delta_r$. In this case, the rear wheel steering angle $\delta_r$, is given as a mathematical function of the steering wheel steering angle $\theta_h$ and the vehicle speed V, and therefore accounts for the contribution of the vehicle speed to the yaw rate response of the vehicle. This mathmatical model also takes into account deviations from standard operating conditions. In other words, the actual yaw rate computing unit 21 comprises a standard yaw rate computing unit 22 which computes a standard yaw rate u according to the vehicle speed V, the steering wheel steering angle $\theta_h$ and the rear wheel steering angle $\delta_r$, assuming that the vehicle equipped with standard tires is traveling over a standard road surface, and an operating condition compensating unit 23 which changes the standard yaw rate u according to the deviations of the road conditions and the tire conditions from the standard conditions, and produces a best estimate of the actual yaw rate as the computed yaw rate $\gamma$. With this arrangement, if the actual yaw rate is given by a separate yaw rate sensor, it is possible to estimate the transfer function of the operating condition compensating unit 23 or the factors which are causing the actually measured yaw rate to deviate from the standard yaw rate u. The standard yaw rate was obtained from the vehicle speed V, the steering wheel steering angle $\theta_h$, and the rear wheel steering angle $\delta_r$, which changes depending on the vehicle speed in the case of a four wheel steering vehicle, but it can be also obtained only from the vehicle speed V, and the steering wheel steering angle $\theta_h$ in the case of more conventional vehicles capable of steering only the front wheels.

According to the present invention, the road friction is determined from the actual yaw rate $\gamma$ obtained from a yaw rate sensor, and the computed yaw rate $\gamma$ which depends on the operating conditions of the vehicle which, for instance, may consist of the vehicle speed, the steering wheel steering angle and the rear wheel steering angle in the case of a four wheel steering vehicle. FIG. 3 shows a system which exemplifies the basic principle of the present invention. This system comprises a yaw rate sensor 19, and a yaw rate response model unit 24. The output from the yaw rate sensor 19 can be estimated from the mathematical model of FIG. 2. The yaw rate response model unit 24 comprises a standard yaw rate computing unit 22 which is identical to that of the actual yaw rate computing unit 21, a yaw rate estimating unit 25, and a parameter identifying unit 26.

Figure 4:
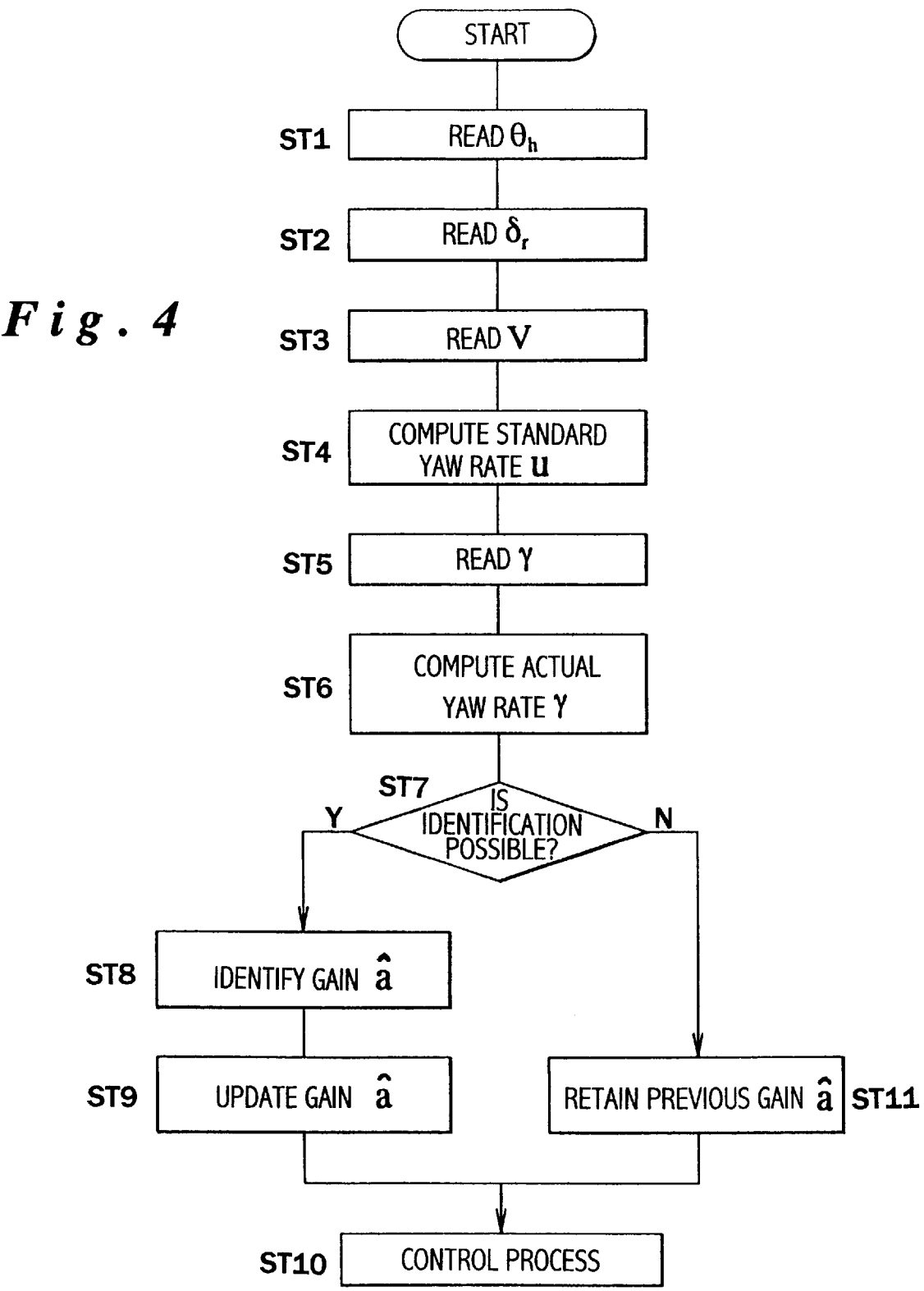
FIG. 4 is a flow chart illustrating the control flow for identifying a parameter of a variation term which is associated with the road friction.

Now the operation of the yaw rate response model unit 24 is described in the following with reference to FIG. 4. First of all, the steering wheel steering angle $\theta_h$ is read in step ST1, and the rear wheel steering angle $\delta_r$ is read in step ST2. The vehicle speed V is read in step ST3. A standard yaw rate u is computed from these values assuming that the vehicle is traveling over a standard road surface with standard tires in step ST4. The method for computing the standard yaw rate u is described in the following.

The transfer function of the yaw rate response of the vehicle is expressed by the following equation.

$$\begin{bmatrix} Pf(S) \\ Pr(S) \end{bmatrix} = \frac{\begin{bmatrix} Nf^{-1}\left(\frac{2L_fK_f}{J_z} S + \frac{4K_fK_rL}{J_zM_sV}\right) \\ -\left(\frac{2L_rK_r}{J_z} S + \frac{4K_f + K_rL}{J_zM_sV}\right) \end{bmatrix}}{S^2 + \left\{\frac{2(K_f+K_r)}{M_sV} + \frac{2(L_f^2K_f + L_r^2K_r)}{J_zV}\right\} S + \left\{\frac{4K_fK_rL}{J_zM_sV} - \frac{2(L_fK_f - L_rK_r)}{J_z}\right\}} \quad (1)$$

where $M_s$ is the mass of the vehicle, $J_z$ is the yaw moment of inertia of the vehicle, $N_f$ is the steering gear ratio, $L_f$ and $L_r$ are the longitudinal distances of the front wheels and the rear wheels from the center of gravity of the vehicle, $K_f$ and $K_r$ are the cornering powers of the front and rear wheels, V is the vehicle speed, $L=L_f+L_r$, and s is the Laplacian variable.

Thus, the standard yaw rate u can be expressed as follows.

$$u = Pf(s) \cdot \theta_h + Pr(s) \cdot \delta_r \quad (2)$$

Equation (2) can be discretized into the following form by a bilinear transformation.

$$\begin{aligned} u(n \cdot T) = & B_0(V) \cdot \{\theta_h(n \cdot T) + \theta_h((n-1) \cdot T)\} + \\ & B_2(V) \cdot \{\theta_h((n-1) \cdot T) + \theta_h((n-2) \cdot T)\} + \\ & C_0(V) \cdot \{\delta_r(n \cdot T) + \delta_r((n-1) \cdot T)\} + \\ & C_2(V) \cdot \{\delta_r((n-1) \cdot T) + \delta_r((n-2) \cdot T)\} + \\ & A_1(V) \cdot \{u((n-1) \cdot T) + A_2(V) \cdot ((n-2) \cdot T)\} \end{aligned} \quad (3)$$

where the parameters $A_1$, $A_2$, $B_0$, $B_2$, $C_0$, and $C_2$ are map parameters which depend on the vehicle speed.

The actual yaw rate y is read in step ST5, and the computed yaw rate $\hat{\gamma}$ is obtained in step ST6. In this step, the yaw rate is computed by using a currently identified parameter for the operating condition compensating unit 23, and the deviation of the actual yaw rate from the computed yaw rate is given by $\gamma(nT)$. Here, it is assumed that the yaw rate deviation $\gamma(nT)$ can be expressed by the following linear equation.

$$\gamma(nT) = -a \cdot \gamma\{(n-1) \cdot T\} + b \cdot u\{(n-1) \cdot T\} \quad (4)$$

The parameters a and b are estimated by the method of weighted least square. The identification model based on Equation (4) can thus be given as follows.

$$\hat{\gamma}(nT) = \hat{a}(nT) \cdot \gamma\{(n-1) \cdot T\} + \hat{b}(nT) \cdot u\{(n-1) \cdot T\} \quad (5)$$

It is determined in step ST7 if it is possible to identify the parameters, and the program flow advances to step ST8 if it is indeed possible to identify the parameters. The parameters to be estimated (â and b̂) are computed in the parameter identifying unit 26 in step ST8, and the identified parameters are updated in step ST9.

In the sequential identification logic conducted in steps ST8 and ST9, the identification error $\epsilon(nT)$ can be given by $$\epsilon(nT) = \hat{\gamma}(nT) - \gamma(nT) = \hat{\theta}(nT)^t \cdot Z(nT) - \gamma(nT) \quad (6)$$

where $\theta^t[a\ b\ ]$, $\hat{\theta}(nT)^t[\hat{a}(nT)\ \hat{b}(nT)]$ $$Z(nT)^t[-\gamma((n-1)\cdot T)\ u((n-1)\cdot T)] \quad (7)$$

The following equation is used for the identification process (weighted least square method) according to the principle that $\hat{\theta}(nT) \to 0$ as $\epsilon(nT) \to 0$. Here, $\rho$ is a memory coefficient which determines to what extent the past values are taken into account, and $0 < \rho \leq 1$. Therefore, the sequential parameters are identified as follows.

$$\theta(nT) = \theta\{(n-1) \cdot T\} - P\{(n-1) \cdot T\} \cdot Z(nT) \cdot \epsilon(nT) \quad (8)$$

$$\epsilon(nT) = \frac{\epsilon'(nT)}{1 + Z(nT)^t \cdot P\{(n-1) \cdot T\} \cdot Z(nT)}$$

$$\epsilon'(nT) = \theta\{(n-1) \cdot T\}^t \cdot Z(nT) - \gamma(nT)$$

$$P(nT) = (1/P)[P\{(n-1) \cdot T\} - \frac{P\{(n-1) \cdot T\} \cdot Z(nT) \cdot Z(nT)^t \cdot P\{(n-1) \cdot T\}}{P + Zn(nT)^t \cdot P\{(n-1) \cdot T\} \cdot Z(nT)}]$$

In step ST10 following step ST9, the program flow advances to an alternate path of the control flow. More specifically, when it is determined in step ST7 that parameter identification is not possible, the program flow advances to step ST11. In this case, the identification parameters are maintained when advancing to step ST10. Once this control process is executed in the block diagram of FIG. 3 as described above, the parameters for the variation of the yaw rate response model of the four-wheel steering system are changed according to the identified parameters $\theta^t = [a\ b\ ]$.

Figure 3:
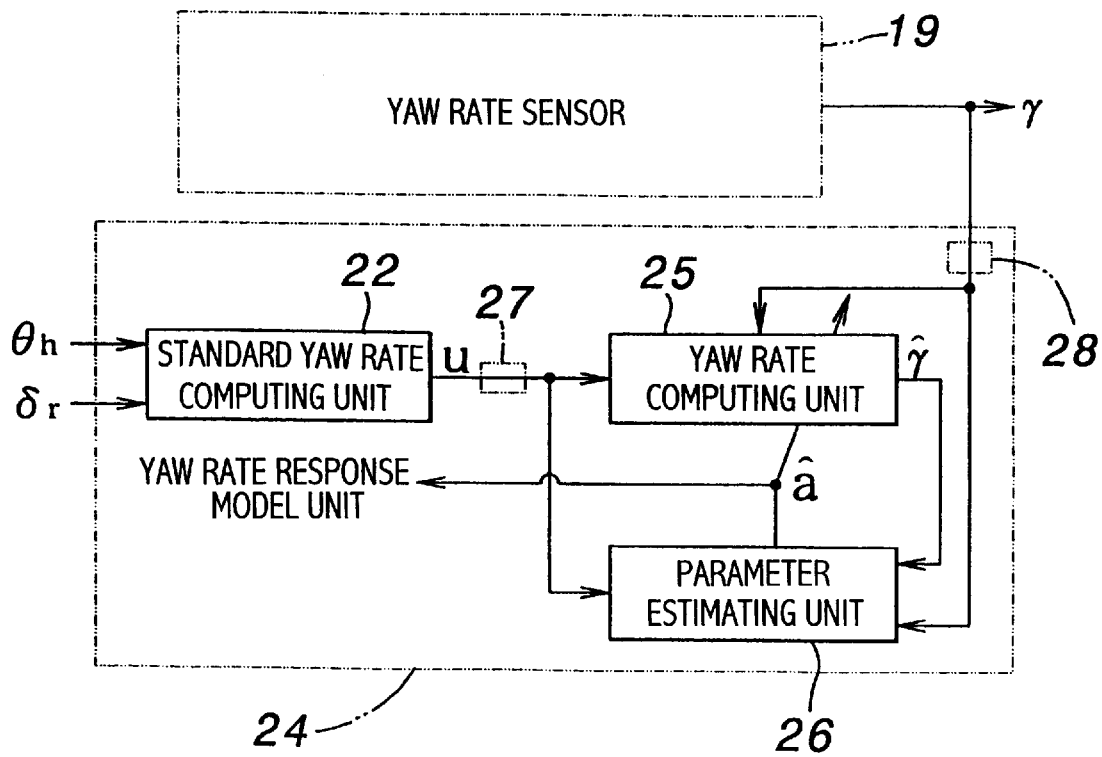
FIG. 3 is a block diagrams of an embodiment of the road friction estimating system according to the present invention.

In the above described flow, preferably, the filter computation process for the standard yaw rate u is carried out between steps ST4 and ST5 in a filter 27 indicated by imaginary lines in FIG. 3. This filter 27 may consist of a low pass filter (for instance a second-order Butterworth filter) to avoid deviations between the standard yaw rate and the actual yaw rate in a high frequency range (rapid steering) from becoming excessive.

The transfer function of the low pass filter for continuous time is given by the following equation.

$$P(s) = \frac{\omega_n^2}{s^2 + \sqrt{2}\,\omega_n s + \omega_n^2} \quad (9)$$

In Equation (9), $\omega_n = 2\pi f_n$, where $f_n$ is a cut-off frequency. By setting the input as u, and the output as u', Equation (9) can be discretized by a bilinear transformation as given in the following.

$$u'(nT) = \beta \cdot \{u(n \cdot T)\} + 2u\{(n-1) \cdot T\} + u\{(n-2) \cdot T\} + \alpha_1 u'\{(n-1) \cdot T\} + \alpha_2 u'\{(n-2) \cdot T\} \quad (10)$$

It is also preferable to place a filter 28 between steps ST5 and ST6 to filter the actual yaw rate γ as indicated by the imaginary lines in FIG. 3. The previous discussion equally applies to the case of the actual yaw rate, and the resulting equation is given in the following.

$$\gamma'(nT) = \beta \cdot \{\gamma(n \cdot T)\} + 2\gamma\{(n-1) \cdot T\} + \gamma\{(n-2) \cdot T\} + \alpha_1 \gamma'\{(n-1) \cdot T\} + \alpha_2 \gamma'\{(n-2) \cdot T\} \quad (10)'$$

It thus becomes possible to improve the capability of the vehicle to control the effects of external disturbances such as cross wind, and uneven braking forces by suitably changing the standard yaw rate according to the road condition and the tire property. Also, due to the reduction in the yaw rate deviation during the normal operation of the vehicle, unnecessary steering of the rear wheels can be avoided so that it is possible to avoid the discomfort to the vehicle occupant and improve the control performance of the system.

According to this embodiment, because only a variational part of the actual transfer function of the vehicle response is required to be identified, a relatively simple algorithm can be used for estimating the road friction and changing the standard yaw rate as opposed to the control systems requiring the entire vehicle model to be identified. Also, the identification algorithm according to the present invention may be made independent from the vehicle speed. The parameter consists of a gain in the case of a zero-th order model, and a gain and a cut-off frequency in the case of first-order model. In either case, the road friction can be estimated from the parameter or the parameters of the variation term of the transfer function of the model of the yaw rate response of the vehicle. Therefore, the load on the ECU and the necessary capacity of ROM and RAM can be minimized.

In the above described embodiment, the road friction was estimated from the deviation of the yaw rate computed from the operating data of the vehicle from the yaw rate detected by a yaw rate sensor, but it is also possible to define a standard lateral acceleration, and estimate the road friction from the deviation of a computed lateral acceleration from an actually measured lateral acceleration. The obtained road friction can be used not only for controlling the steering angle of the rear wheels but also for ABS (anti-lock brake systems), TCS (traction control systems) and four-wheel drive systems. The obtained road friction may be either directly used for control purpose or for warning purpose.

The present invention is not limited by the identification process illustrated in FIG. 3, and can also be based on the method of least square, the method of maximum likelihood, Karman filters, and so on. The parameters â and b̂ in FIG. 3 may consist of a vector value or a scalar value.

When the standard yaw rate computing unit 22 is limited in accuracy, so is the identification process of FIG. 3. If it is possible to determine that such a situation exists (when the control flow advances from step ST7 to ST11), the identification process of FIG. 3 is discontinued, and the previous identification parameters â and b̂ may be maintained. Such a situation typically arises when the vehicle speed is low, when the steering angle is large, and when the vehicle is turning a tight corner at a high speed. Also, when the vehicle is traveling along a straight path, and the steering angle is therefore extremely small, the identification accuracy also drops, and a similar measure may be taken.

When it is difficult to evaluate the accuracy of the identification process, it may be particularly recommendable to use the filters 27 and 28, which were described previously, to remove spurious noises from external signals and to thereby prevent the identification accuracy from being impaired. If the spurious noises are mainly in high frequency ranges, low-pass filters should be used. Conversely, if the spurious noises are mainly in low frequency ranges, high-pass filters should be used.

Figure 5:
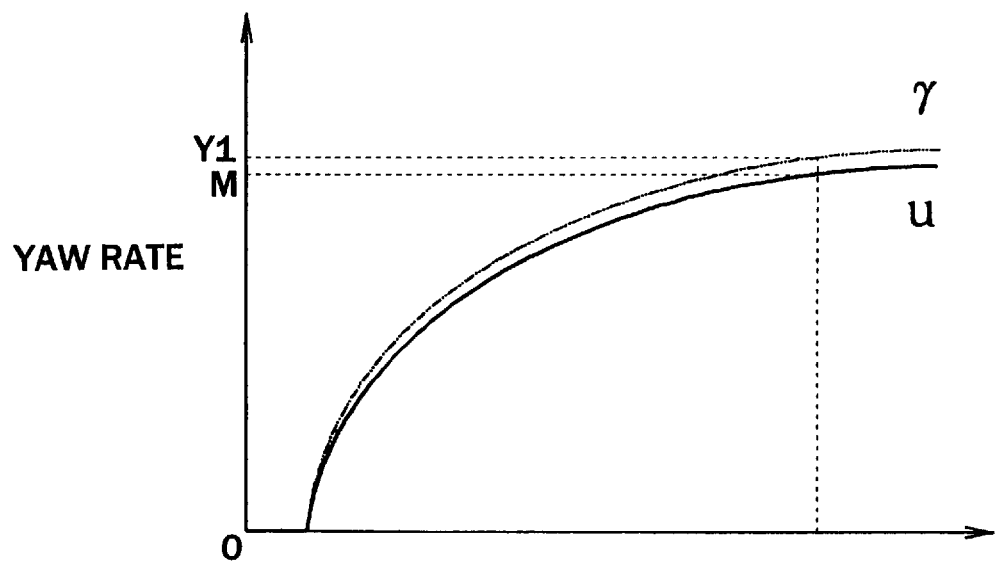
FIGS. 5 and 6 are graphs showing typical modes of the deviation of the actual yaw rate from the computed standard yaw rate on a dry road surface and a compacted snow road surface, respectively.

The process of evaluating the road friction is described in the following with reference to FIGS. 5 and 6. In FIG. 5, the changes in the standard yaw rate u when the vehicle is traveling over a standard road surface with standard tires are indicated by solid lines, and the changes in the actual yaw rate γ when the vehicle is operating under a corresponding standard condition are indicated by dotted lines. Suppose that the standard yaw rate u is M, and the actual yaw rate γ is Y1 at a certain time point. Because Y1/M≈1, it can be determined that the road surface is dry, and the road friction is relatively high.

Figure 6:
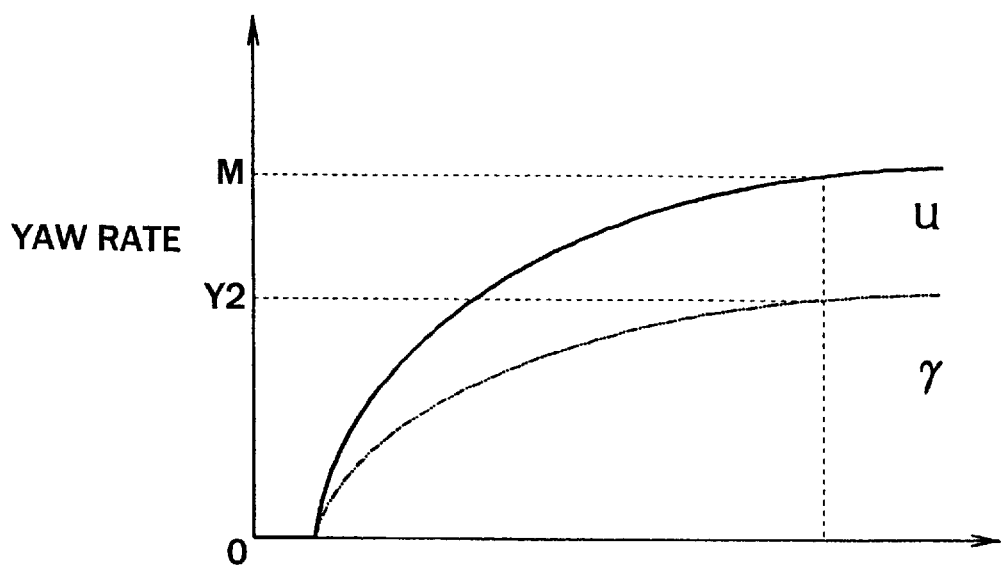

In FIG. 6, the changes in the actual yaw rate γ when the vehicle is traveling over compacted snow are indicated by imaginary lines. Suppose that the standard yaw rate u is M, and the actual yaw rate γ is Y2 at a certain time point. In this case, Y2/M<<1, and it can be determined that the road friction is relatively low. By appropriately associating the ratio of the actual yaw rate γ to the standard yaw rate u to various road conditions, it is possible to determine the road condition with a desired accuracy.

Figure 7:
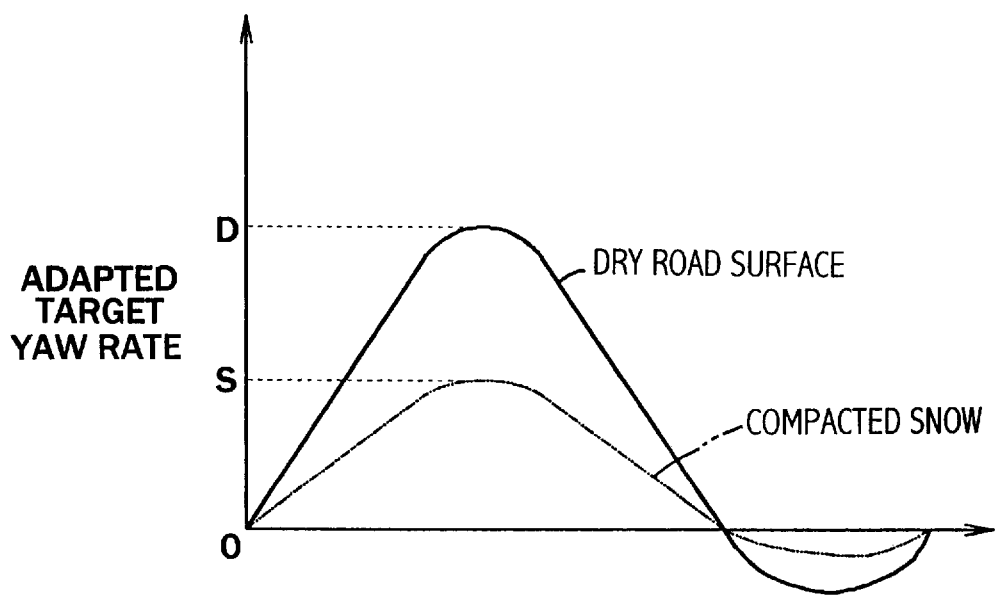
FIG. 7 is a graph showing the optimum target yaw rates for a four-wheel steering vehicle on a dry road surface and a compacted snow road surface, respectively.
Figure 8:
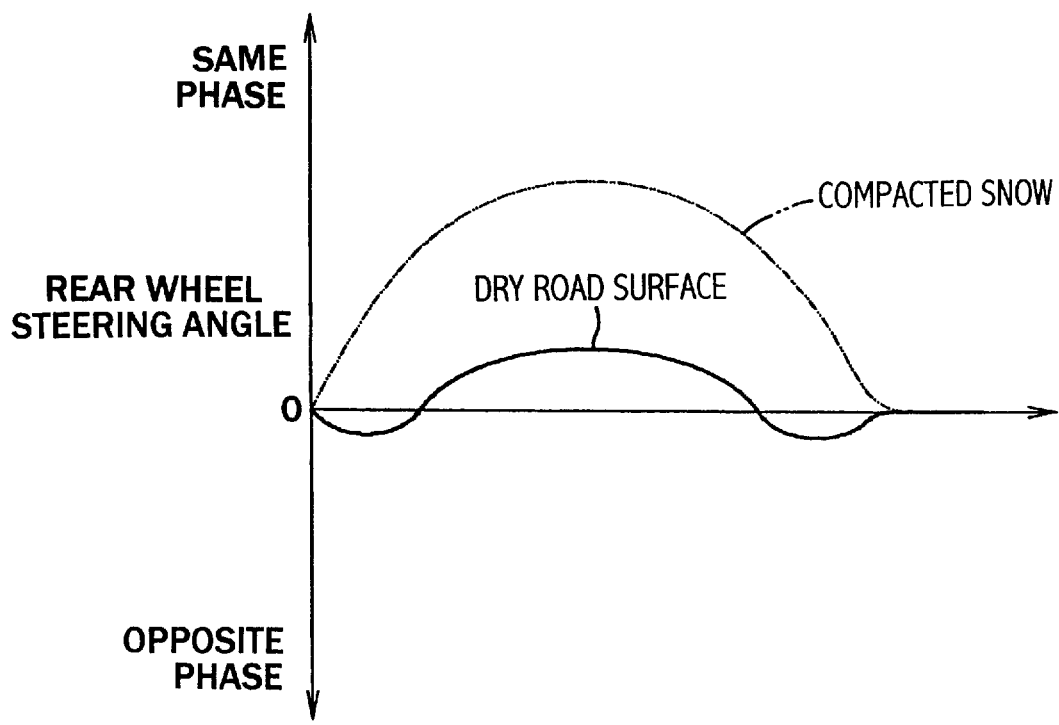
FIG. 8 is a graph showing the rear wheel steering angles for a four-wheel steering vehicle which result in the optimum target yaw rates shown in FIG. 7 on a dry road surface and a compacted snow road surface, respectively.

FIG. 7 shows an example of the changes in the adapted standard yaw rate when the vehicle has changed its driving lane. The sold line curve indicates the case when the road surface is dry, and the imaginary line curve indicates the case when there is a compacted snow accumulation on the road surface. When the ratio of the actual yaw rate to the yaw rate under the standard condition is approximately 1, or S/D=1, it is determined that the road surface is dry. When S/D≈0.3, it can be determined that there is a compacted snow accumulation on the road surface. FIG. 8 shows the differences in the steering angles of the rear wheels depending on the condition of the road surface.

Figure 9:
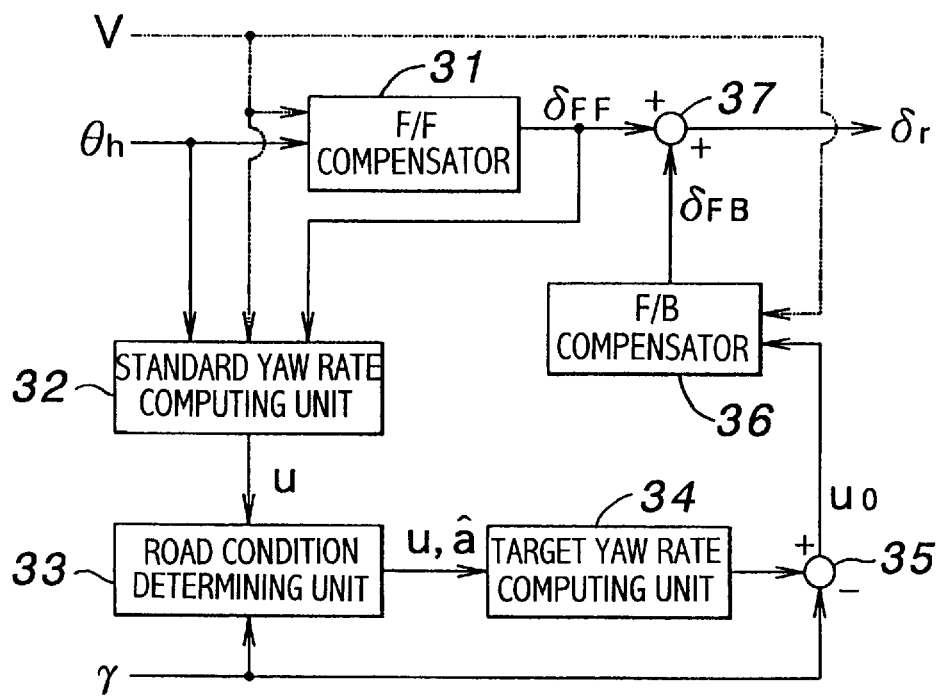
FIG. 9 is a block diagram of a system for controlling the rear wheel steering angle of a four-wheel steering vehicle according to the estimated road friction.

FIG. 9 is a block diagram for describing the control flow for determining the road surface condition. The steering wheel steering angle $\theta_h$ is supplied to a F/F (feed forward) compensator 31, and a standard yaw rate computing unit 32 which may be identical to the standard yaw rate computing unit 22 of FIG. 3. The vehicle speed V is similarly supplied to the F/F compensator 31 and the standard yaw rate computing unit 32. The output $\delta_{FF}$ of the F/F compensator 31 is supplied to the standard yaw rate computing unit 32.

The standard yaw rate u computed by the standard yaw rate computing unit 32 is supplied to a road surface condition determining unit 33 which also receives an actual yaw rate γ obtained by a yaw rate sensor. The output a of the road surface condition determining unit 33 as well as the computed standard yaw rate u is supplied to a target yaw rate computing unit 34. The deviation $u_0$ of the target yaw rate from the actual yaw rate γ is obtained at a substractor 35, and is then supplied to a F/B (feedback) compensator 36. The F/B compensator 36 also receives the vehicle speed V, and the output $\delta_{FB}$ of the F/B compensator 36 is added to the output $\delta_{FF}$ of the F/F compensator 31 to provide a rear wheel steering angle $\delta_r$.

Figure 10:
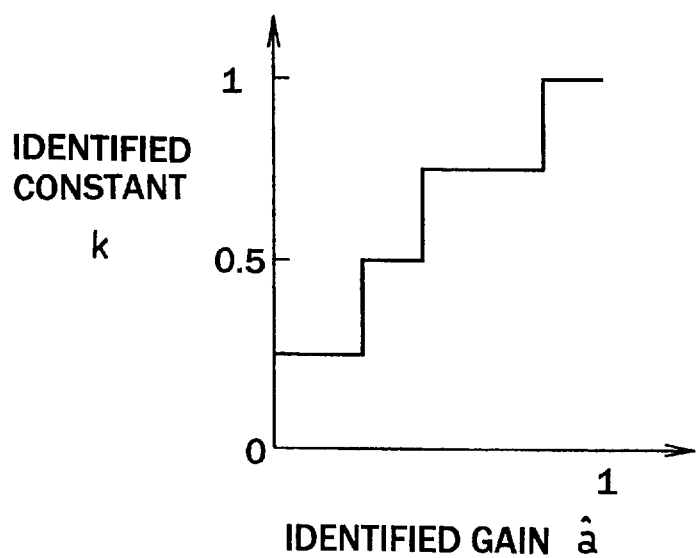
FIG. 10 is a graph showing the map for converting the estimated gain of the variation term into a value associated with a road friction.

The standard yaw rate computing unit 32 and the road surface condition determining unit 33 in the block diagram of FIG. 9 correspond to the yaw rate responce model or identification unit 24 of FIG. 3. The target yaw rate computing unit 34 computes the target yaw rate from the output of the road surface condition determining unit 33, and this process is described in the following with reference to FIG. 9. The road surface condition determining unit 33 determines the road surface condition (which may range from a standard paved dry road surface to a slippery compacted snow road surface), and an estimation gain â is obtained. An estimation constant k is obtained from the obtained estimation gain by using a map illustrated in FIG. 10 in which k=1 corresponds to a standard road surface while the minimum value of k corresponds to a slippery compacted snow road surface.

In the target yaw rate computing unit 34, according to the estimation constant k, the target yaw rate u is computed by multiplying the constant k to the previously obtained target yaw rate, or u←u×k. When the driving lane is changed on a dry road surface, the adapted target yaw rate changes as indicated by solid lines in FIG. 7, and the vehicle is allowed to undergo a yaw movement in a brisk manner. On the other hand, on a compacted snow road surface, the magnitude of the yaw rate should be highly controlled, and it is essential to maintain the stability of the vehicle. To achieved this goal, as illustrated in FIG. 8, the rear wheels are steered primarily in a same phase relationship. By thus determining the road surface condition, it is possible to maintain an optimum stability of the vehicle under a wide range of conditions.

Thus, according to the present invention, it is possible to adapt the control action of a vehicle over a wide range of road conditions which may include the conditions of the road surface and the properties of the tires. In particular, when the control system for the vehicle controls the steering angle of the rear wheels according to the vehicle speed and the steering input, if the road friction is low, and the cornering power of the tires is therefore limited, an undesirably excessive steering angle could be selected. However, by controlling the steering angle of the rear wheels according to the current road friction, it is possible to control the rear wheels in a stable fashion without creating any unresponsive impression of the vehicle response.

Figure 11:
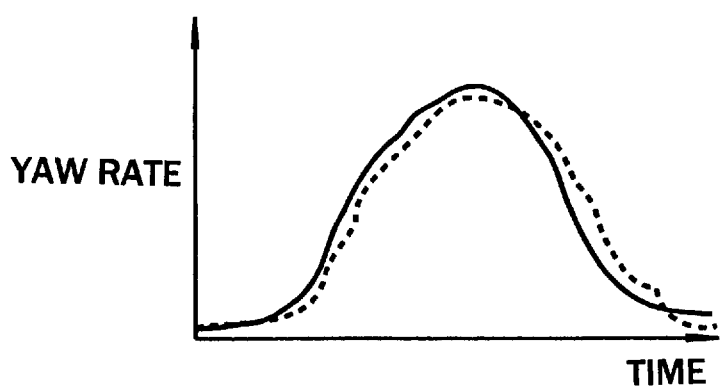
FIGS. 11 and 12 are graphs showing the deviations of the actual yaw rates from the estimated standard yaw rates when the steering wheel is turned in one direction and then back in the opposite direction for the cases when the vehicle is traveling over a high friction road surface and a low direction road surface, respectively.
Figure 12:
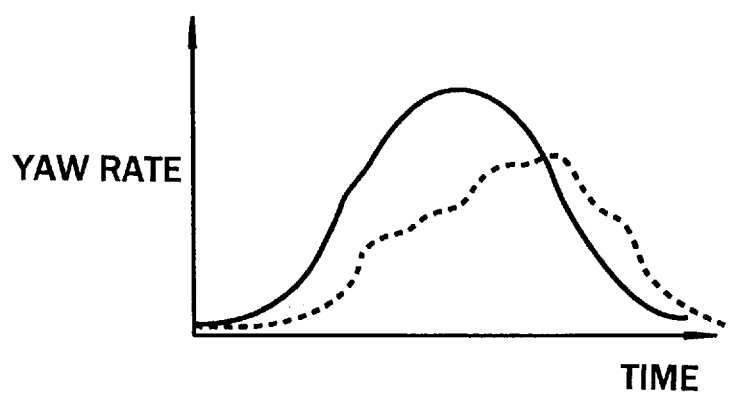

When the road friction is high, the actual yaw rate substantially agrees with the standard yaw rate estimated from the steering input and the vehicle speed by using a yaw rate model of the vehicle as illustrated in FIG. 11 in which the solid curve indicates the estimated yaw rate while the dotted line indicates the actual yaw rate. However, as the road friction diminishes, not only the gain ratio of the actual yaw rate to the estimated yaw rate diminishes, but also the phase delay of the actual yaw rate to the estimated yaw rate increases. This is illustrated in the graph of FIG. 12. In the above described embodiments, with the aim of minimizing the computation load on the ECU, the phase delay was disregarded in estimating the road friction.

Figure 13:
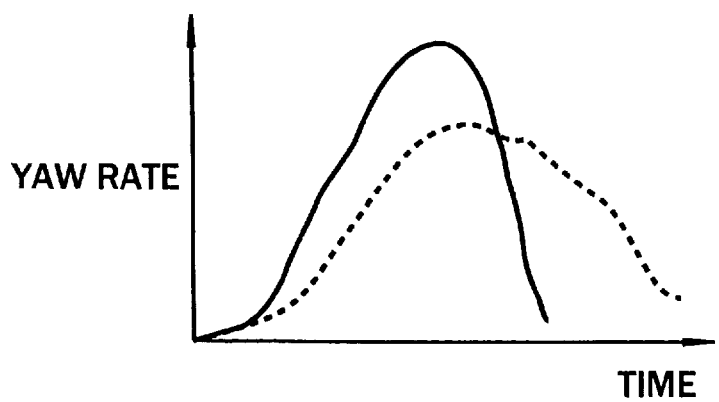
FIG. 13 is a graph showing the deviation of the actual yaw rate from the estimated standard yaw rate when the steering wheel is sharply turned in one direction and then back in the opposite direction.

However, when the steering wheel is quickly turned in one direction and then turned back in the opposite direction particularly on a slippery road surface, the estimated yaw rate quickly diminishes as soon as the steering wheel is turned back into the original position because the yaw rate is estimated primarily from the steering input. However, in reality, the actual yaw rate does not so immediately diminish as its response involves a substantial phase delay, and the actual yaw rate could become substantially greater than the estimated yaw rate. This is illustrated in FIG. 13. Even when the steering speed is limited, and the actual yaw rate involves a relatively small time delay, a certain problem could arise. When the steering wheel is initially turned in one direction, because the difference between the estimated yaw rate and the actual yaw rate progressively increases, a relatively accurate estimation of the road friction is possible. However, when the steering wheel is turned in the opposite direction, due to the phase delay in the actual yaw rate, the estimated road friction tends to be substantially greater than the actual road friction. This should be avoided by all means as it violates the principle of fail-safe.

Figure 14:
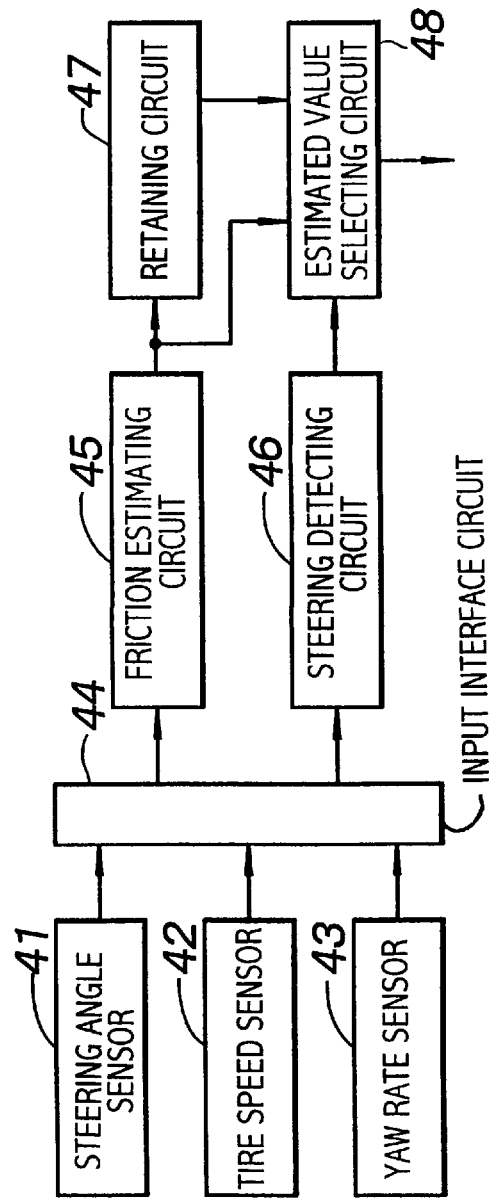
FIG. 14 is a block diagram of a second embodiment of the present invention.

The embodiment described in the following is intended to correct this problem. Referring to FIG. 14, this system comprises a steering wheel steering angle sensor 41, a tire rotational speed sensor 42, a yaw rate sensor 43, an input interface circuit 44 for receiving output signals from these sensors and converting them into suitable forms, a road friction estimating circuit 45 for estimating the road friction according to these output signals, a steering detection circuit 46 for detecting if the steering angle is being increased or being decreased, a retaining circuit 47 for retaining the road friction obtained in the preceding control cycle, and an estimated value selecting circuit 48 for selectively supplying either one of the previously estimated value of the road friction retained by the retaining circuit 47 and the road friction value computed by the road friction estimating circuit 45 in the current control cycle.

Figure 15:
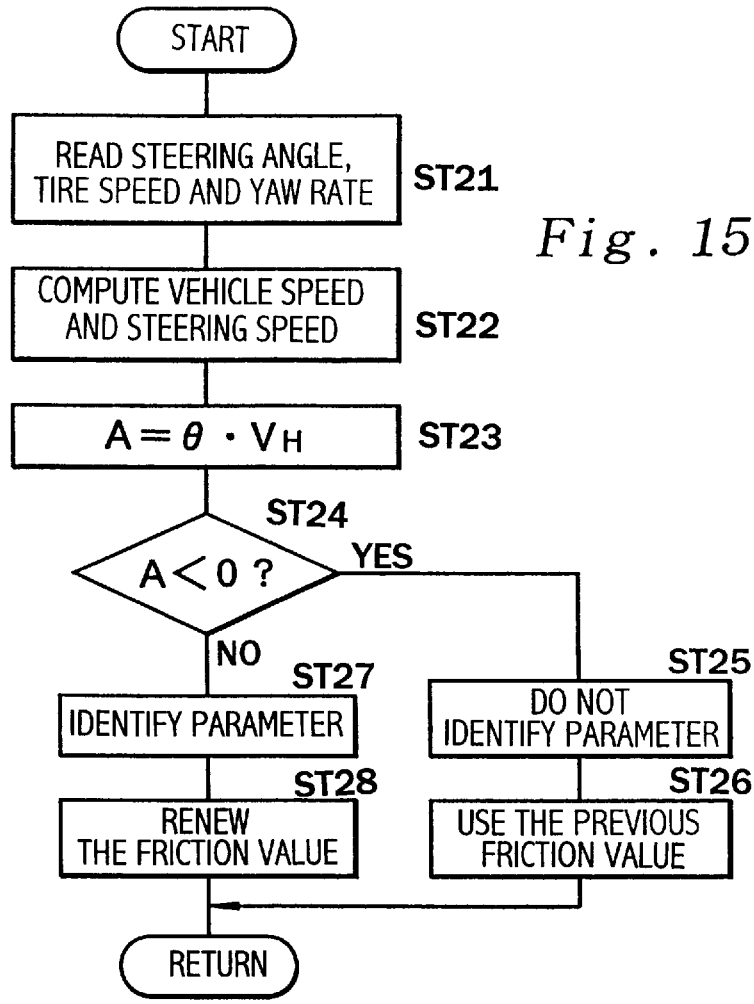
FIG. 15 is a flow chart showing the control flow of the system illustrated in FIG. 14.

The basic control flow of this system is described in the following with reference to the flow chart of FIG. 15. First of all, the steering wheel steering angle, the tire rotational speed and the actual yaw rate are read from the steering wheel steering angle sensor 41, the tire rotational speed sensor 42, and the yaw rate sensor 43 via the input interface circuit 44 (step ST21). The vehicle speed and the steering speed are computed from these sensor output signals in step ST22. The steering detection circuit 46 produces a value $A=\theta \cdot V_H$ in step ST23. Here, $\theta$ represents the steering wheel steering angle, and $V_H$ represents the steering speed or the time derivative of the steering wheel steering angle. The sign of the value A indicates the steering direction (step ST24). For instance, suppose that the steering angle in the right direction corresponds to the positive sign of the value $\theta$. Then, the sign of $\theta$ is positive whenever the steering wheel is turned in the right direction. On the other hand, $V_H$ is positive when the steering angle is being increased in the right direction, and changes to negative when the steering wheel being returned toward the original position. Thus, A is positive in sign whenever the absolute value of the steering angle is being increased either in the right or left direction, and is negative in sign whenever the absolute value of the steering angle is being reduced either in the right or left direction. Therefore, in this case, the identification of the parameter is prohibited when the sign of the value A is negative as it indicates that the steering wheel is being turned back, or the absolute value of the steering angle is being decreased (step ST25), and the road friction retained by the retaining circuit is used for the current control cycle (step ST26).

Figure 16:
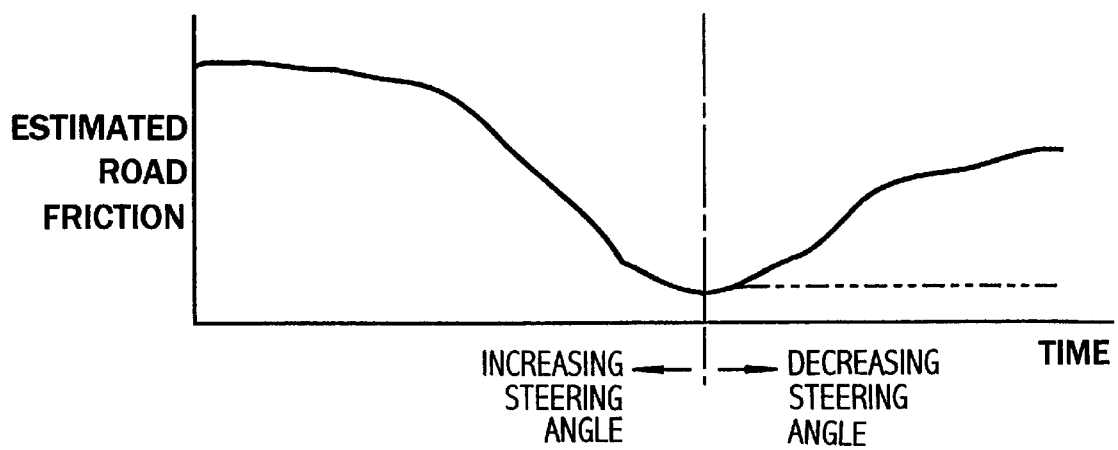
FIGS. 16A and B are graphs which further characterizes the invention.
Figure 16:
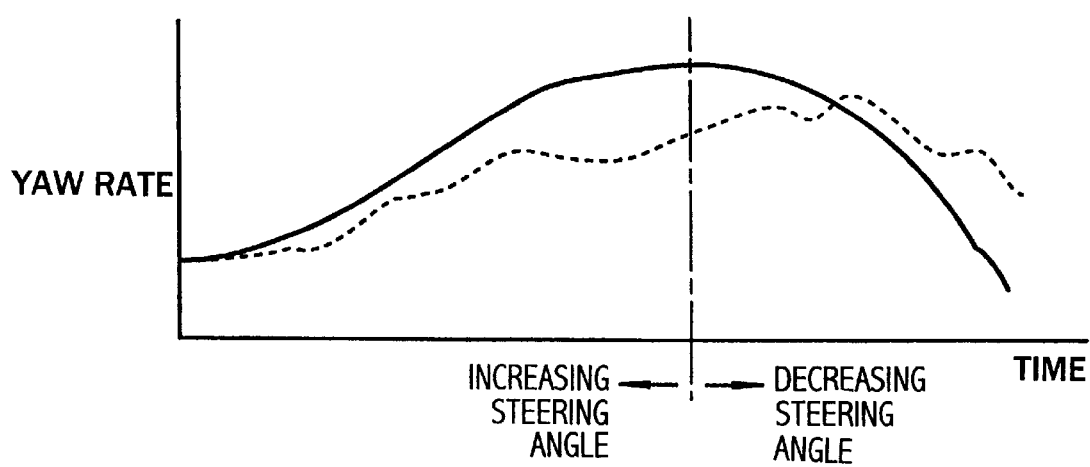

On the other hand, when the sign of the value A is positive, the parameter is identified in step ST27, and the road friction computed in the current control cycle is used for the current control cycle in step ST28. In this manner, by retaining the road friction immediately before turning back the steering wheel as indicated by the double dot chain line as opposed to the solid line in FIG. 16A, it is possible to avoid detecting the road friction to be greater than it actually is although the estimated yaw rate may become less than the actual yaw rate after the steering wheel has been turned back and the steering angle is therefore being progressively diminished, the estimated yaw rate and the actual yaw rate being indicated by the solid line and the single dot chain line, respectively, in FIG. 16B.

Thus, the road friction is estimated by relying on the yaw rate only when the steering angle is being increased, and it is possible to avoid estimating the road friction to be greater than it actually is. In particular, because the S/N ratio in estimating the road friction gets better as the actual yaw rate and the estimated yaw rate become larger in value, by retaining the road friction which was determined when the steering angle took a maximum value, the precision in estimating the road friction can be increased.

Although the present invention has been described in terms of specific embodiments thereof, it is possible to modify and alter details thereof without departing from the spirit of the present invention.

What we claim is:

1. A road friction estimating system, comprising
   a yaw rate sensor for detecting an actual yaw rate of a vehicle;
   standard yaw rate computing means for computing a standard yaw rate according to a yaw rate response model of said vehicle and vehicle operating data including a steering wheel steering angle and a vehicle speed assuming that said vehicle is equipped with standard tires and traveling over a standard road surface, said yaw rate model being expressed by a transfer function including a variation term;
   identification means which determines a parameter of said variation term of said transfer function according to a deviation of said actual yaw rate detected by said yaw rate sensor from said standard yaw rate computed by said standard yaw rate; and
   converting means for converting said parameter determined by said identification means into a value representing a frictional property between a road surface and said tires.

2. A road friction estimating system according to claim 1, wherein said parameter of said variation term is identified as a parameter which minimizes said deviation of said actual yaw rate detected by said yaw rate sensor from said standard yaw rate computed by said standard yaw rate computing means.

3. A road friction estimating system according to claim 1, wherein said identification means carries out a recursive process involving a plurality of steps of substituting of a parameter identified in a current step into said transfer function for a subsequent step.

4. A road friction estimating system according to claim 1, further including a low pass filter placed between said yaw rate sensor and said identification means.

5. A road friction estimating system according to claim 1, further including a low pass filter placed between said standard yaw rate computing means and said identification means.

6. A road friction estimating system according to claim 1, wherein said variation term consists of a zero-th order transfer function.

7. A road friction estimating system according to claim 1, wherein said variation term consists of a first-order transfer function.

8. A road friction estimating system according to claim 1, further comprising steering detecting means which detects if the steering wheel is being turned away from a neutral position or being turned back toward said neutral position, and storage means for storing a value corresponding to said frictional property obtained in a preceding control cycle, said value stored in said storage means being used as an output a current control cycle of said system when the steering wheel is being turned back toward said neutral position.

9. A vehicle control system, including a road friction estimating system according to claim 1, further comprising:
   modifying means for modifying said yaw rate response model of said vehicle according to said frictional property between a road surface and said tires obtained by said road friction estimating system; and
   steering control means for controlling at least one of a front wheel steering angle and a rear wheel steering angle of the vehicle so as to achieve said standard yaw rate computed by said standard yaw rate computing means using said modified yaw rate response model.

* * * * *

UNITED STATES PATENT AND TRADEMARK OFFICE
CERTIFICATE OF CORRECTION

PATENT NO : 5,869,753
DATED : 09 February 1999
INVENTOR(S): Nobuyoshi Asanuma, Kiyoshi Wakamatsu, Yoshimitsu Akuta, Manabu Ikegaya, Nobuo Sugitani, Yukihiro Fujiwara It is certified that error appears in the above-identified patent and that said Letters Patent are hereby corrected as shown below:

Page 1 of 2

Column 1, line numbered between 14 and 15, change "provided" to --provide--.

Column 2, line 57, change "fourwheel" to --four-wheel--.

Column 3, 3rd line, change "diagrams" to --diagram--;
5th line, change "diagrams" to --diagram--;
line numbered between 44 and 45, change "characterizes" to --characterize--.

Column 4, line 29, change "$\Lambda_h$" to --$\theta_h$--.

Column 5, line numbered between 52 and 53, change "rate y" to --rate $\gamma$--.

Column 6, approximately lines 11-12 (equation(7)), change "$\theta^t[a\ b]$" to --$\theta^t \triangleq [a\ b]$--; change "$\hat{\theta}(nT)^t[\hat{a}(nT)\hat{b}(nT)]$" to --$\hat{\theta}(nT)^t \triangleq [\hat{a}(nT)\ \hat{b}(nT)]$--; change "$Z(nT)^t[-\gamma((n-1)\cdot T)u((n-1)\cdot T)]$" to --$Z(nT)^t \triangleq [-\gamma((n-1)\cdot T)\ u((n-1)\cdot T)]$--;

approximately line 33 (first line of parameters for equation (8)), change "$\theta$" (both occurrences) to --$\hat{\theta}$--;

approximately line 42 (denominator portion of equation (8)), change "$P + Zn(nT)^t$" to --$P + Z(nT)^t$--.

Column 8, line 36, change "sold" to --solid--;
line 58, change "output a" to --output $\hat{a}$--.

UNITED STATES PATENT AND TRADEMARK OFFICE
CERTIFICATE OF CORRECTION

PATENT NO : 5,869,753
DATED : 09 February 1999
INVENTOR(S): Nobuyoshi Asanuma, Kiyoshi Wakamatsu, Yoshimitsu Akuta, Manabu Ikegaya, Nobuo Sugitani, Yukihiro Fujiwara It is certified that error appears in the above-identified patent and that said Letters Patent are hereby corrected as shown below:

Column 9, line 3, change "responce" to --response--.

Column 10, line 46, before "being" insert --is--.

Signed and Sealed this

Twenty-fourth Day of August, 1999

Attest:

Q. TODD DICKINSON

Attesting Officer

Acting Commissioner of Patents and Trademarks